US011964325B2

(12) United States Patent
Yamamoto

(10) Patent No.: US 11,964,325 B2
(45) Date of Patent: Apr. 23, 2024

(54) METAL MAGNETIC MATERIAL AND ELECTRONIC COMPONENT

(71) Applicant: Murata Manufacturing Co., Ltd., Kyoto (JP)

(72) Inventor: Makoto Yamamoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 1459 days.

(21) Appl. No.: 15/701,808

(22) Filed: Sep. 12, 2017

(65) Prior Publication Data

US 2018/0005738 A1 Jan. 4, 2018

Related U.S. Application Data

(63) Continuation of application No. PCT/JP2016/056758, filed on Mar. 4, 2016.

(30) Foreign Application Priority Data

Mar. 20, 2015 (JP) ................................ 2015-057362

(51) Int. Cl.

| | |
|---|---|
| ***H01F 1/147*** | (2006.01) |
| ***B22F 1/00*** | (2022.01) |
| ***B22F 1/142*** | (2022.01) |
| ***B22F 3/24*** | (2006.01) |
| ***C22C 33/02*** | (2006.01) |
| ***C22C 38/02*** | (2006.01) |
| ***H01F 1/24*** | (2006.01) |
| ***H01F 17/00*** | (2006.01) |
| ***H01F 17/04*** | (2006.01) |
| ***H01F 27/255*** | (2006.01) |
| *H01F 27/29* | (2006.01) |

(52) U.S. Cl.

CPC .................. *B22F 3/24* (2013.01); *B22F 1/00* (2013.01); *B22F 1/142* (2022.01); *C22C 33/02* (2013.01); *C22C 38/02* (2013.01); *H01F 1/14766* (2013.01); *H01F 1/24* (2013.01); *H01F 17/0013* (2013.01); *H01F 17/04* (2013.01); *H01F 27/255* (2013.01); *B22F 2003/248* (2013.01); *B22F 2998/10* (2013.01); *C22C 2202/02* (2013.01); *H01F 27/292* (2013.01)

(58) Field of Classification Search

None

See application file for complete search history.

(56) References Cited

FOREIGN PATENT DOCUMENTS

| | | | | |
|---|---|---|---|---|
| JP | 2004-200676 | A | | 7/2004 |
| JP | 2004253787 | A | * | 9/2004 |
| JP | 2007-027354 | A | | 2/2007 |
| JP | 2010-062424 | A | | 3/2010 |
| JP | 4866971 | B2 | | 2/2012 |
| JP | 5082002 | B1 | | 11/2012 |
| JP | 2012-238841 | A | | 12/2012 |

(Continued)

OTHER PUBLICATIONS

Machine translation of JP2004-200676A. (Year: 2004).*

(Continued)

*Primary Examiner* — Xiaowei Su

(74) *Attorney, Agent, or Firm* — Studebaker & Brackett PC

(57) ABSTRACT

Zinc is added to a metal magnetic alloy powder including iron and silicon. An element is formed using this magnetic material, and a coil is formed inside or on the surface of the element.

3 Claims, 3 Drawing Sheets

(56) References Cited

FOREIGN PATENT DOCUMENTS

| | | | |
|---|---|---|---|
| JP | 2013-254917 | A | 12/2013 |
| JP | 2015-065363 | A | 4/2015 |

OTHER PUBLICATIONS

Machine translation of JP2010-062424A. (Year: 2010).*
Machine translation of JP2004-253787A. (Year: 2004).*
International Search Report issued in PCT/JP2016/056758; dated May 24, 2016.
Written Opinion issued in PCT/JP2016/056758; dated May 24, 2016.
An Office Action; "Notification of Reasons for Refusal", issued by the Japanese Patent Office dated Jul. 11, 2017, which corresponds to Japanese Patent Application No. 2015-057362.

* cited by examiner

| | Alloy | Additive (wt%) | | μ' @10MHz | Volume Resistivity Ω·cm | Withstand Voltage V/mm |
|---|---|---|---|---|---|---|
| | | Li2CO3 | ZnO | | | |
| Example1 | Fe-Si | - | 0.25 | 28 | $9.14 \times 10^9$ | 392 |
| Example2 | | - | 0.5 | 28 | $8.18 \times 10^9$ | 353 |
| Example3 | | - | 1 | 26 | $1.01 \times 10^{10}$ | 335 |
| Comp.Ex1 | | - | - | 22 | $2.55 \times 10^8$ | 309 |
| Comp.Ex2 | | 0.5 | - | 27 | $1.10 \times 10^8$ | 295 |
| Comp.Ex3 | Fe-Si-Cr | - | - | 22 | $1.46 \times 10^6$ | 155 |

METAL MAGNETIC MATERIAL AND ELECTRONIC COMPONENT

CROSS REFERENCE TO RELATED APPLICATIONS

This application claims priority to Japanese Patent application no. 2015-057362 filed on Mar. 20, 2015, and to International Patent Application No. PCT/JP2016/056758 filed on Mar. 4, 2016, the entire content of which is incorporated herein by reference.

TECHNICAL FIELD

The present disclosure relates to a metal magnetic material used for a power inductor or the like used in an electronic circuit, and an electronic component using the same.

BACKGROUND

A power inductor used in a power supply circuit is required to be reduced in size and loss, and adaptable to a larger current. In order to meet these requirements, studies have been conducted on using a metal magnetic material with a high saturation magnetic flux density for the magnetic material thereof. Although the metal magnetic material has an advantage of high saturation magnetic flux density, the insulation resistance of the material itself is low, and it is necessary to ensure insulation between material particles so as to use the material as a magnetic material of an electronic component. If the insulation cannot be ensured, conduction through a component body or degradation of material properties increases a product loss.

Conventionally, when a metal magnetic material is used for an electronic component, insulation between material particles is ensured by bonding with a resin or the like or coating particles with an insulating film.

For example, Japanese Laid-Open Patent Publication No. 2010-62424 describes an electronic component formed by firing a material made of an Fe—Cr—Si alloy having a surface coated with ZnO-based glass, under vacuum, under an oxygen-free condition, or at low oxygen partial pressure. However, the material particles must certainly be coated under vacuum, under an oxygen-free condition, or at low oxygen partial pressure so as to prevent sintering, and this causes problems such as an increased additive amount of glass and a higher cost of coating the material particles.

As described above, the conventional techniques of bonding with a resin or the like and coating particles with an insulating film require an increased amount of an insulating material other than the magnetic material for making the insulation more reliable, and have a problem that increasing a volume of material other than the magnetic material leads to degradation of magnetic properties.

A technique of forming a layer of an oxide derived only from a raw material composition in a material particle is disclosed (Japanese Patent Nos. 4866971 and 5082002). This technique includes using an Fe—Cr—Si alloy for material particles and utilizing an insulating film of an oxide derived only from the raw material composition formed in the Fe—Cr—Si alloy particles, which makes degradation of magnetic properties smaller. However, since the material particles are made of the Fe—Cr—Si alloy, the insulation of the formed insulating film may be low or sufficient strength may not be acquired in some cases.

Therefore, a technique of forming a layer of an oxide derived only from a raw material composition in particles and impregnating the layer with a resin or the like is also disclosed (Japanese Laid-Open Patent Publication No. 2012-238841). However, a technique such as impregnation is less practical because not only of increased costs but also of a lack of product stability.

SUMMARY

In a metal magnetic material for an electronic component, magnetic particles must be insulated from each other by a minimum insulating layer so as to ensure high insulation. Additionally, the insulating film must electrically and mechanically be strong. Furthermore, the composition in the material particles must be kept uniform. However, as described above, all the conventional techniques have some unsolved problems.

One or more embodiments of the present disclosure provide a metal magnetic material enabling reliable insulation and having a high saturation magnetic flux density, and a low-loss electronic component using the metal magnetic material and having favorable DC superimposition characteristics.

In one or more embodiments of the present disclosure, zinc is added to a metal magnetic alloy powder made of iron and silicon.

In one or more embodiments of the present disclosure, zinc is added to a metal magnetic alloy powder made of iron and silicon, and a reaction product of the zinc and the metal magnetic alloy powder is generated by a heat treatment.

In one or more embodiments of the present disclosure, zinc is added to a metal magnetic alloy powder made of iron and silicon, and a reaction product of the zinc and the metal magnetic alloy powder is generated by a heat treatment so that an oxide of the metal magnetic alloy powder due to the reaction product is present.

In one or more embodiments of the present disclosure, zinc is added to a metal magnetic alloy powder made of iron and silicon, and a reaction product of the zinc and the metal magnetic alloy powder is generated by a heat treatment so that the reaction product is formed near a surface of the metal magnetic alloy powder.

In one or more embodiments of the present disclosure, an element body is formed by using a metal magnetic material acquired by adding zinc to a metal magnetic alloy powder made of iron and silicon; a reaction product of the zinc and the metal magnetic alloy powder is generated in the element body; and a coil is formed inside, or on the surface of, the element body.

In one or more embodiments of the present disclosure, an element body is formed by using a metal magnetic material acquired by adding zinc to a metal magnetic alloy powder made of iron and silicon; a reaction product of the zinc and the metal magnetic alloy powder is precipitated near the surface of the metal magnetic alloy powder; and a coil is formed inside, or on the surface of, the element body.

In one or more embodiments of the present disclosure, an element body is formed by using a metal magnetic material acquired by adding zinc to a metal magnetic alloy powder made of iron and silicon; the element body is subjected to a heat treatment so that a reaction product of the zinc and the metal magnetic alloy powder is generated in the element body; and a coil is formed inside, or on the surface of, the element body.

In one or more embodiments of the present disclosure, an element body is formed by using a metal magnetic material acquired by adding zinc to a metal magnetic alloy powder made of iron and silicon; the element body is subjected to a heat treatment so that a reaction product of the zinc and the metal magnetic alloy powder is precipitated near the surface of the metal magnetic alloy powder; and a coil is formed inside, or on the surface of, the element body.

In one or more embodiments of the present disclosure, since zinc is added to a metal magnetic alloy powder made of iron and silicon, insulation can reliably be achieved and a saturation magnetic flux density can be made higher with a simple method.

In one or more embodiments of the present disclosure, since an element body is formed by using a metal magnetic material acquired by adding zinc to a metal magnetic alloy powder made of iron and silicon, a reaction product of the zinc and the metal magnetic alloy powder is generated in the element body, and a coil is formed inside, or on the surface of, the element body. A low-loss electronic component having favorable DC superimposition characteristics and high strength can be achieved.

DETAILED DESCRIPTION

In one or more embodiments of the present disclosure, zinc is added to a metal magnetic alloy powder made of iron and silicon. These are subjected to a heat treatment to generate a reaction product of zinc and the metal magnetic alloy powder. This reaction product exists as an oxide of an element constituting the metal magnetic alloy powder and is formed near the surface of the metal magnetic alloy powder.

Therefore, in one or more embodiments of the present disclosure, a substance other than those derived from a raw material composition of material particles can be generated by adding zinc and adjusting the amount thereof, so that insulation can more efficiently be achieved as compared to conventional material particles having an insulating film formed of an oxide derived from a raw material composition.

In one or more embodiments of the present disclosure, an element body is formed by using a metal magnetic material acquired by adding zinc to a metal magnetic alloy powder made of iron and silicon. This element body is subjected to a heat treatment to generate a reaction product of the added zinc and the metal magnetic alloy powder in the element body. This reaction product exists as an oxide of an element constituting the metal magnetic alloy powder and is formed near the surface of the metal magnetic alloy powder. A coil is formed inside, or on the surface of, the element body.

Therefore, in one or more embodiments of the present disclosure, a substance other than those derived from a raw material composition of material particles can be generated by adding zinc and adjusting the amount thereof, so that metal magnetic particles can more efficiently be insulated from each other as compared to conventional material particles having an insulating film formed of an oxide derived from a raw material composition and the metal magnetic particles can firmly be bonded to each other.

Preferred embodiments for carrying out the present disclosure will now be described with reference to FIGS. 1 to 4.

Figure 1:
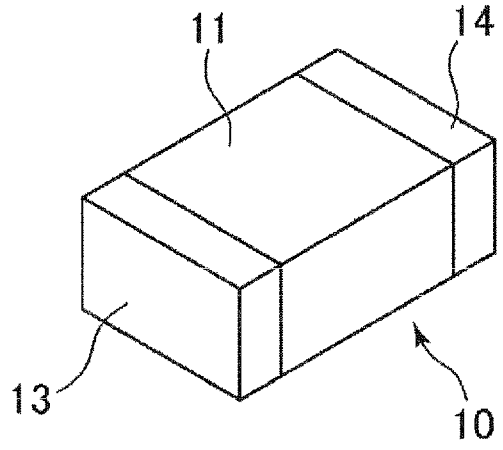
FIG. 1 is a perspective view of an embodiment of an electronic component according to the present disclosure.
Figure 2:
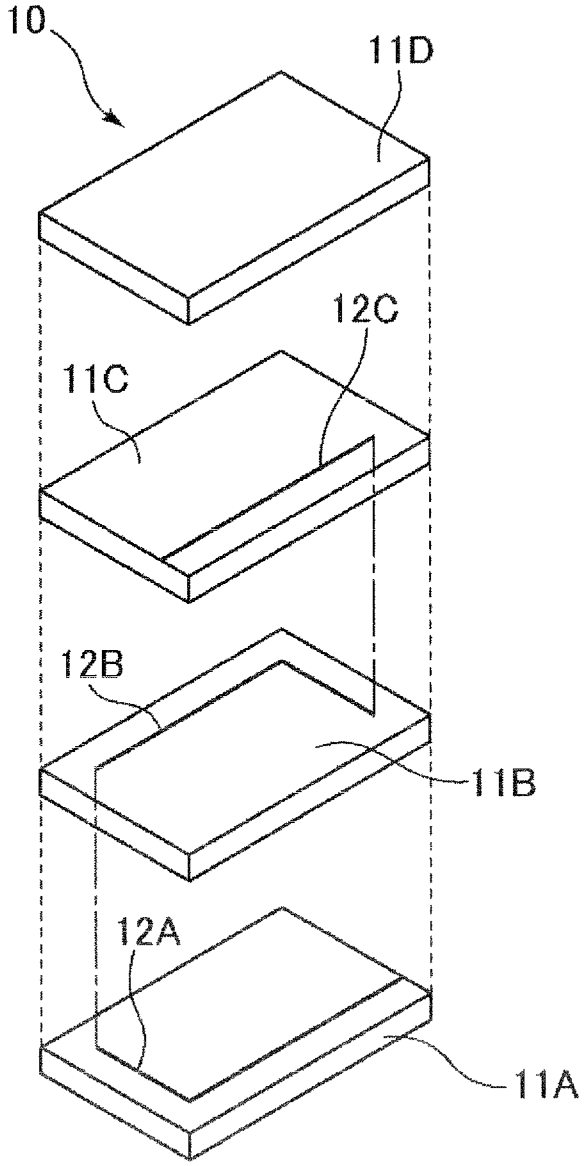
FIG. 2 is an exploded perspective view of FIG. 1.

FIG. 1 is a perspective view of an embodiment of an electronic component according to the present disclosure and FIG. 2 is an exploded perspective view of FIG. 1.

In FIGS. 1 and 2, 10 denotes an electronic component, 11 denotes an element body, and 13 and 14 denote external terminals.

The electronic component 10 is a laminated type inductor having the element body 11 and the external terminals 13, 14.

The element body 11 has metal magnetic material layers 11A, 11B, 11C, 11D, and coil conductor patterns 12A, 12B, 12C.

The metal magnetic material layers 11A, 11B, 11C, 11D are formed of a metal magnetic material acquired by adding zinc to a metal magnetic alloy powder. For the metal magnetic alloy powder, a powder of a metal magnetic alloy made of iron and silicon (so-called Fe—Si-based metal magnetic alloy) is used. In the element body 11 (the metal magnetic material layers 11A, 11B, 11C, 11D), a reaction product of the metal magnetic alloy powder and the added zinc is generated, and this reaction product is formed near the surface of the metal magnetic alloy powder as an oxide of an element constituting the metal magnetic alloy powder. The metal magnetic alloy powder has metal magnetic alloy particles bonded to each other in a state of having a grain boundary between the metal magnetic alloy particles, and a layer containing zinc exists in this grain boundary. This layer containing zinc exists in the grain boundary formed between two grains or in the grain boundary present among three or more grains and is preferably made up of a layer of an oxide of zinc or a layer of an oxide of zinc and another element. The layer containing zinc may further exist on the surfaces of the metal magnetic alloy particles. In this case, the layer may not necessarily be formed so as to entirely cover the surfaces of the metal magnetic alloy particles and may partially be formed on the surfaces of the metal magnetic alloy particles or may have a non-uniform thickness or inhomogeneous composition.

The coil conductor patterns 12A, 12B, 12C are made of a conductor paste that is a metal material such as silver, silver-based material, gold, gold-based material, copper, copper-based material, or the like made into a paste form.

The coil conductor pattern 12A is formed on the surface of the metal magnetic material layer 11A. This coil conductor pattern 12A is formed for less than one turn. One end of the coil conductor pattern 12A is led out to an end surface of the metal magnetic material layer 11A.

The coil conductor pattern 12B is formed on the surface of the metal magnetic material layer 11B. This coil conductor pattern 12B is formed for less than one turn. One end of the coil conductor pattern 12B is connected via a conductor in a through-hole of the metal magnetic material layer 11B to the other end of the coil conductor pattern 12A.

The coil conductor pattern 12C is formed on the surface of the metal magnetic material layer 11C. This coil conductor pattern 12C is formed for less than one turn. One end of the coil conductor pattern 12C is connected via a conductor in a through-hole of the metal magnetic material layer 11C to the other end of the coil conductor pattern 12B. The other end of the coil conductor pattern 12C is led out to an end surface of the metal magnetic material layer 11C.

The metal magnetic material layer 11D for protecting the coil conductor pattern is formed on the metal magnetic material layer 11C having the coil conductor pattern 12C formed thereon.

In this way, a coil pattern is formed in the element body 11 by the coil conductor patterns 12A to 12C between the metal magnetic material layers. On both end surfaces of the element body 11, external terminals 13, 14 are formed as shown in FIG. 2. The one end of the coil conductor pattern 12A and the other end of the coil conductor pattern 12C are connected to the external terminal 13 and the external terminal 14, respectively, so that the coil pattern is connected between the external terminal 13 and the external terminal 14.

The electronic component of the present disclosure having a configuration as described above is manufactured as follows.

First, a predetermined amount of zinc is added to a powder of an Fe—Si alloy having a predetermined composition and then mixed, and a binder such as PVA (polyvinyl alcohol) is further added. The mixture is kneaded into a paste form to obtain a metal magnetic material paste. A conductor paste for forming the coil conductor patterns 12A to 12C is separately prepared. The metal magnetic material paste and the conductor paste are alternately printed in layers to acquire the element body (shaped body) 11. The acquired element body 11 is subjected to a de-binding treatment at a predetermined temperature in the atmosphere and to a heat treatment to acquire the electronic component 10. The external terminals 13, 14 can be formed after the heat treatment, for example. In this case, for example, the external terminals 13, 14 can be disposed by applying the conductor paste for external terminals to both ends of the element body 11 after the heat treatment and then performing a heating treatment. Alternatively, the external terminals 13, 14 may be disposed by applying the conductor paste for external terminals to both ends of the element body 11 after the heat treatment and then performing a baking treatment followed by plating applied to the baked conductors. In this case, to prevent a plating solution from infiltrating into voids present in the element body 11, the voids present in the element body 11 may be impregnated with a resin.

In the present embodiment, by using the material acquired by adding zinc to the metal magnetic alloy powder for the metal magnetic material used for the metal magnetic material layers 11A to 11D constituting the element body 11, both magnetic characteristics and insulation characteristics are satisfied. More specific examples of this metal magnetic material will hereinafter be described with a comparative experiment including comparative examples.

Figures 3, 4:
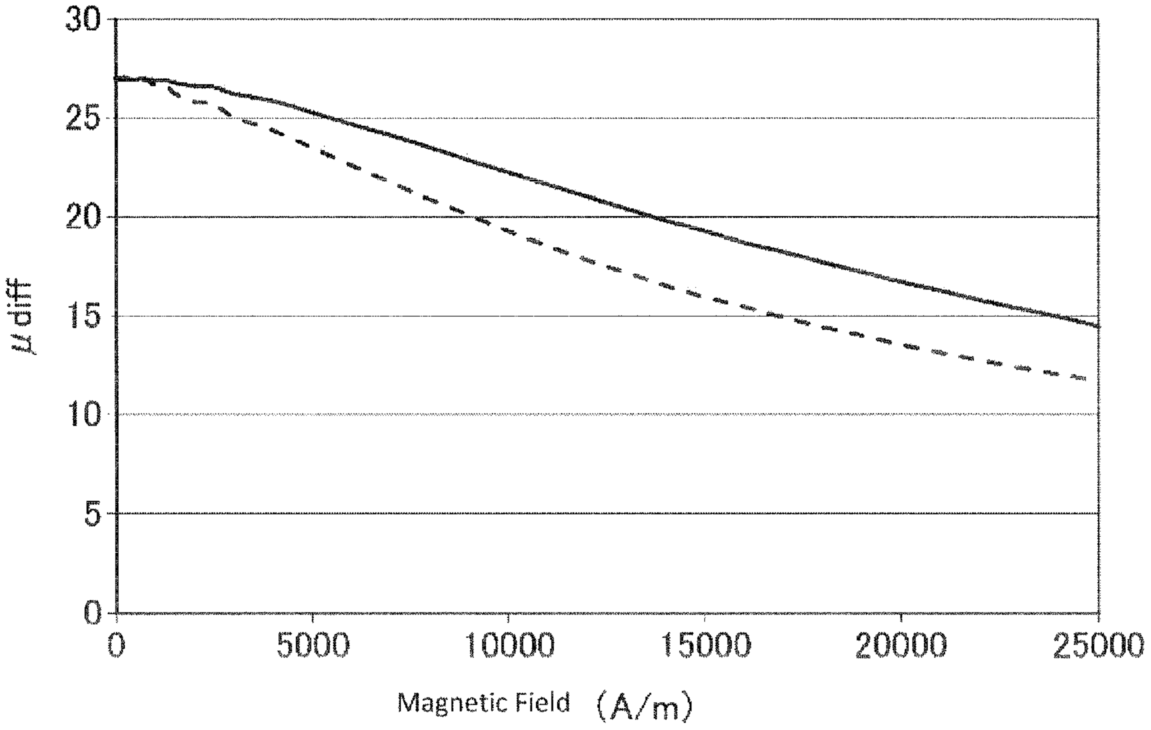
FIG. 3 is a table summarizing compositions and comparative experiment results of examples and comparative examples used in a comparative experiment.
FIG. 4 is a graph of characteristics of Example 2 and Comparative Example 2.

FIG. 3 is a table summarizing compositions and comparative experiment results of examples and comparative examples used in a comparative experiment.

In this comparative experiment, zinc oxide (ZnO) was added in a predetermined amount shown in FIG. 3 to the Fe—Si alloy powder having a predetermined composition and then mixed, and a binder such as PVA (polyvinyl alcohol) was further added before granulation and kneading for acquiring a metal magnetic material paste, which was then pressurized at the pressure of 343 Mpa to form an element body (shaped body), and the element body was subjected to a de-binding (degreasing) treatment at 400° C. in the atmosphere followed by a heat treatment at 650° C. in the atmosphere to form an inductor. While the Fe—Si alloy powder can be manufactured by various powdering methods including atomization methods such as a water atomization method and a gas atomization method, a reductive method, a carbonyl method, a pulverization method or the like, the powder used was not subjected to a treatment for forming a metal oxide on the surface thereof. In other words, the powder used was the Fe—Si alloy powder itself without being subjected to a special treatment on the powder surface.

A metal magnetic material acquired without adding anything to the Fe—Si alloy powder (Comparative Example 1) had low magnetic permeability and volume resistivity at 10 MHz. A metal magnetic material acquired by adding 0.5 wt % lithium carbonate ($Li_2CO_3$) to the Fe—Si alloy powder (Comparative Example 2) was able to be improved in the magnetic permeability as compared to Comparative Example 1; however, the volume resistivity and the withstand voltage were lower than those of Comparative Example 1. A metal magnetic material acquired without adding anything to the Fe—Si—Cr alloy (Comparative Example 3) was reduced in the volume resistivity and the withstand voltage as compared to Comparative Example 1.

In contrast, the metal magnetic material of the present disclosure was able to be increased in the volume resistivity and the withstand voltage while ensuring the magnetic permeability by adding 0.25 to 1 wt % zinc oxide (ZnO) to the Fe—Si alloy powder.

A toroidal core was prepared for Example 2 and Comparative Example 2 having substantially the same magnetic permeability, and 200 turns of winding were applied to the toroidal core to measure the DC superposition characteristic at 100 KHz. FIG. 4 is a graph of a relationship between an applied magnetic field and a differential permeability obtained by calculating the differential permeability from a measured inductance value and the dimensions of the toroidal core for Example 2 and Comparative Example 2.

In Example 2 indicated by a solid line, a reduction in magnetic permeability due to a magnetic field was able to be made smaller as compared to Comparative Example 2 indicated by a dotted line.

When Example 2 was observed by SEM-EDX, it was confirmed that Zn is contained in a grain boundary layer present in the surfaces of the metal magnetic alloy particles and between the metal magnetic alloy particles. As a result, an insulating film stronger than the conventional films is formed, so that the strength can be improved.

Therefore, since the electronic component of the present disclosure has the magnetic permeability, the volume resistivity, and the withstand voltage of the metal magnetic material higher than those of the conventional materials, the inductance value of the coil can be increased and the resistance of the coil can be lowered while ensuring a high withstand voltage, so that the coil excellent also in DC superposition characteristics can be acquired.

The present disclosure is not limited to the embodiments described above and can be implemented as various modifications and alterations, which also fall within the scope of the present disclosure.

(1) Although the temperature of the heat treatment has been described with specific examples in the embodiments, the present disclosure is not limited thereto, and the temperature of the heat treatment may be changed as appropriate depending on a composition of the metal magnetic material, a particle diameter of the metal magnetic material, desired magnetic characteristics or the like.

(2) Although the reaction product of zinc and the metal magnetic alloy powder is generated by the heat treatment in the description of the embodiments, the same effect can be acquired even when a portion of zinc remains unreacted as an independent oxide (zinc oxide).

(3) In the embodiments, the amount of zinc added to the metal magnetic material may be changed as appropriate depending on a particle diameter of the metal magnetic material, desired magnetic characteristics or the like.

(4) In the description of the embodiments, the metal magnetic alloy powder has no oxide formed on the surface thereof. This is not a limitation and, for example, an oxide may be formed on the surface of the metal magnetic alloy powder. As natural oxidation progresses or oxidation progresses in a high temperature heat treatment, a metal oxide derived from the metal magnetic alloy powder may naturally be formed partially or entirely on the surface of the metal magnetic alloy powder, for example. Although insulation due to this metal oxide derived from the metal magnetic alloy powder is not expected in the present disclosure, the formation of this metal oxide on the surface of the metal magnetic alloy powder causes no problem at all.

(5) Although adjacent particles of the metal magnetic alloy powder in the element body are bonded to each other via the reaction product of zinc and the elements constituting the metal magnetic alloy powder in the description of the embodiments, the adjacent particles of the metal magnetic alloy powder in the element body may not only be bonded to each other via the reaction product of zinc and the metal magnetic alloy powder but also be bonded to each other in a portion where the reaction product of zinc and the metal magnetic alloy powder does not exist.

(6) The metal magnetic alloy powder may be any Fe—Si-based metal magnetic alloy powder, and the same effect can be acquired even when the powders having different compositions and different particle diameters are mixed. Even if the metal magnetic alloy contains trace components inevitably mixed during manufacturing, the effects can be acquired.

(7) The element body may be formed as a core having a rod shape, a drum shape, an H shape or the like, and the coil may be wound around the outer circumference of this core.

Although not described in detail, the embodiments and modification embodiments can be used in a combined manner. The present disclosure is not limited by the embodiments described above.

The invention claimed is:

1. A metal magnetic material, consisting of an oxide of zinc;

a metal magnetic alloy particle made of iron and silicon, where the oxide of zinc and the metal magnetic alloy particle are separate from each other before being mixed together to form the metal magnetic material; and a reaction product of the oxide of zinc and the metal magnetic alloy particle that is generated by a heat treatment, the reaction product arranged near a surface of the metal magnetic alloy particle, wherein a grain boundary layer exists between the adjacent metal magnetic alloy particles, the grain boundary layer includes the zinc oxide that is interposed between the reaction products, and the reaction product includes the oxide of zinc, the iron derived from the metal magnetic alloy particle and the silicon.

2. An electronic component, comprising an element body formed of the metal magnetic material according to claim 1, wherein a coil is formed inside, or on a surface of, the element body.

3. The magnetic material according to claim 1, wherein the grain boundary layer further includes an oxide of the zinc and another element.

* * * * *